Figure 7:
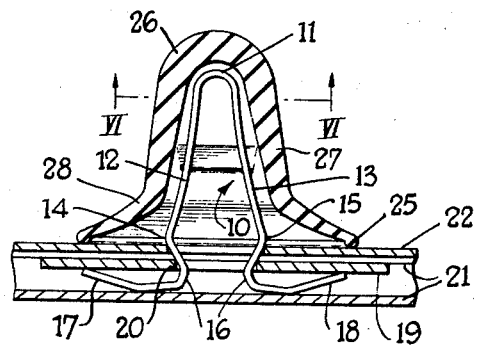

April 19, 1960     E. B. FERNBERG     2,932,866
FASTENERS
Filed Oct. 29, 1956     2 Sheets-Sheet 1
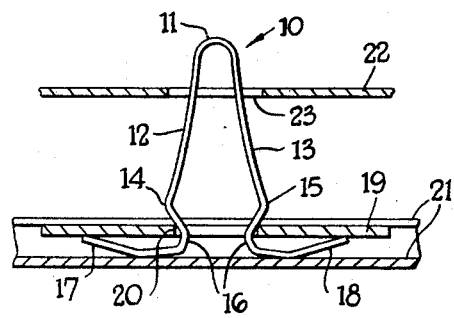
FIG.1.
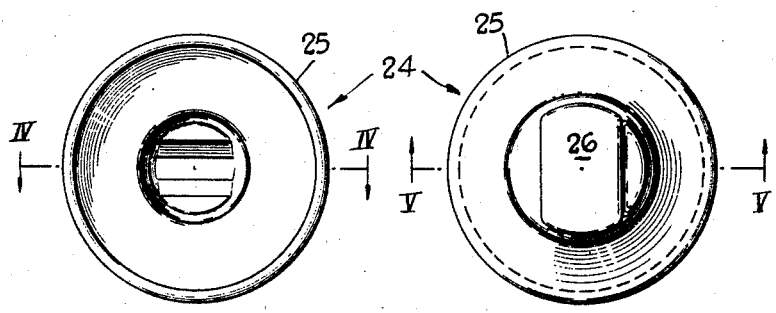
FIG.3.     FIG.2.
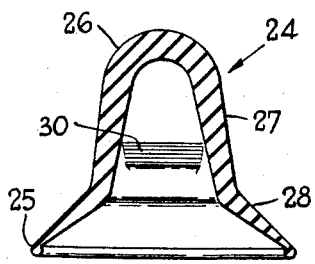 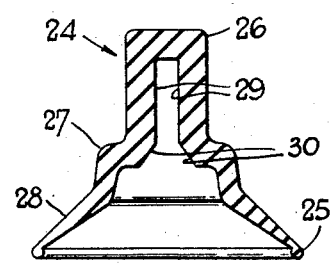
FIG.4.     FIG.5.
INVENTOR
Eric Bergh Fernberg
BY
Malcolm T. Fraser
ATTORNEY United States Patent Office 2,932,866
Patented Apr. 19, 1960

2,932,866
FASTENERS

Eric Birger Fernberg, Northwood, England, assignor to F. T. Products Limited, London, England, a British company Application October 29, 1956, Serial No. 618,980
Claims priority, application Great Britain October 27, 1955

2 Claims. (Cl. 24—73)

The present invention relates to fasteners.

It is common practice at the present time to attach any one of a variety of members to the sheet steel body panel of an automobile with the aid of U-shaped spring clips which are snapped through holes in the body panel. Examples of members so attached are trim pads, beadings and cables.

Each clip has one part designed to hold the member and another part of U- or diamond-shape designed to snap into, and engage behind, the hole in the panel. This snap-engaging part may be formed from a flat strip of steel bent so as to have a nose and two spring limbs one or both of which has an elbow designed to provide the snap-engagement with the panel hole.

Typical examples of such a clip are to be seen in the drawings accompanying British patent specification No. 618,939.

One serious difficulty encountered in the use of such clips is that dust and moisture can seep through the holes in which they are engaged and it is an object of this invention to render such clips dust- and moisture-proof.

Figure 6:
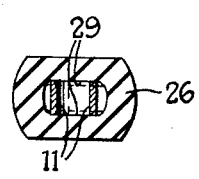
Figure 8:
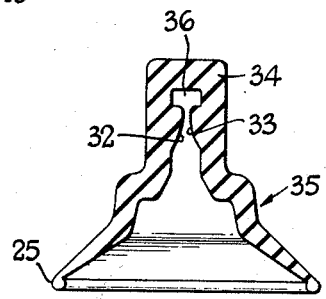
Figure 9:
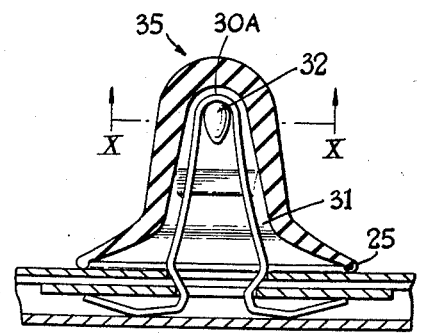
Figure 10:
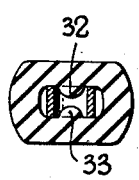

Preferred forms of the invention will now be described with reference to the accompanying diagrammatic drawings, in which:

Figure 1 is an elevation, partly in section, of a clip engaged in a beading and showing also an apertured panel, Figures 2 to 6 are five views of a rubber cap designed to fit over the snap-engaging portion of the clip after the latter has been inserted in the panel, Figures 2 and 3 being a plan and underplan, respectively, of the cap, and Figures 4, 5 and 6 being sections on the lines IV—IV, V—V and VI—VI respectively, Figure 6 also showing the clip in position in the cap, Figure 7 is a sectional elevation showing the cap and clip in assembled position holding a beading to a panel, Figure 8 is a sectional elevation of another form of cap, Figure 9 is a sectional elevation showing the cap of Figure 8 engaged on a clip, and Figure 10 is a section on the line X—X of Figure 9.

Referring now to Figure 1, at 10 is shown a spring clip formed from a rectangular strip of flat steel bent to diamond shape so as to have a closed apex 11, limbs 12 and 13, elbows 14 and 15, a neck 16 and feet 17 and 18. Around the neck is engaged a retainer 19 in the form of a flat rectangular strip of steel formed with a rectangular hole 20 of width a little greater than that of the clip and of length such that the clip may be snapped into the hole.

A beading is shown at 21 and an automobile steel body panel at 22.

In use the feet of the clip together with the retainer 19 are slipped into the beading and the limbs 12, 13 of the clip snapped into a hole 23 formed in the panel 22.

After the clip has been assembled in this way, the other part of the fastener, namely a rubber or like cap 24 (Figures 2 to 7) is forced over the closed apex of the clip until the beaded rim 25 of the cap seats on the panel 22 to form a dust- and moisture-proof seal (Figure 7).

Details of the cap 24 are shown in Figures 2 to 6.

It will be seen that it has an elongate head 26, side walls 27 and a conical feathered skirt 28 terminating in the circular bead 25.

Internally, the head of the cap is formed with a parallel-sided slot 29, the entry to which has a sloping lead-in 30.

The unstressed width of the slot 29 is a little less than the width of the metal strip from which the clip 11 is made, with the result that when the cap is pushed over the apex of the clip, the cap is held on the clip by friction, as can be seen best from Figure 6. At the same time the bead 25 of the cap is pressed against the panel 21 (Figure 7).

The apex of the clip may be an external fit in the slot 29 in the cap or may have the clearance in one direction shown in Figure 7.

From Figure 6 it can be seen that the apex 11 of the clip is of shape and size such that it expands and distorts the inside of the slot 29 in the cap to cause the cap to be firmly retained on the apex of the clip. The height of the cap is related to the length of the fastener protruding from the panel in such a way that the rim 25 of the cap can be pressed against the panel 22.

In the arrangement of Figures 8 to 10 the closed apex 30A of a clip 31 is forced between and over a pair of internal lugs 32 and 33 formed in the head 34 of a rubber cap 35, the final position of the clip being shown in Figure 9, with the apex 30A of the clip lying in a recess 36 above the two lugs.

As before a bead 25 of the cap is pressed against the panel to produce a seal.

The two essential parts of the fastener are the metal clip 10 (or 31) and the cap 24 (or 35), the cap being held to the closed apex of the clip either mechanically, or by friction, or by both.

What I claim is:

1. A two-part fastener for securing two members together, the one part being a clip in the form of a strip of metal bent into the form of a substantially diamond-shaped, snap engaging stud with one apex closed and the other open and, integral therewith, a pair of outwardly turned feet, and the other part being a resilient imperforate cap having an elongated head, side walls and an outward flaring skirt, the head being formed internally with a parallel-sided slot the entry to which has sloping lead in faces and the width of which is less than the width of the stud so that the closed apex of the stud can be inserted in and is held in the closed end of the cap, the arrangement being such that the stud can be engaged by its feet in one member to be fastened and snapped through a hole in the other member, after which the cap can be pressed over and engaged by the apex of the stud engaging with said parallel-sided slot whilst the skirt of the cap is pressed into sealing engagement with the said other member to be fastened, the cap lying wholly on one side of the said other member.

2. A fastener as claimed in claim 1 wherein the cap is formed in its head between the ends of said slot with at least one internal bulge which can be engaged inside the diamond-shaped stud.

References Cited in the file of this patent

UNITED STATES PATENTS

| 2,267,511 | Van Uum | Dec. 23, 1941 |
| 2,367,657 | Boersma | Jan. 23, 1945 |
| 2,712,120 | Cochran | June 28, 1955 |
| 2,726,009 | Murdoch | Dec. 6, 1955 |

FOREIGN PATENTS

| 165,424 | Australia | Apr. 15, 1954 |
| 1,093,240 | France | Nov. 17, 1954 |
| 1,098,502 | France | Mar. 9, 1955 |